(12) United States Patent
Rule et al.

(10) Patent No.: US 12,321,922 B2
(45) Date of Patent: *Jun. 3, 2025

(54) CARD ISSUING WITH RESTRICTED VIRTUAL NUMBERS

(71) Applicant: Capital One Services, LLC, McLean, VA (US)

(72) Inventors: Jeffrey Rule, Chevy Chase, MD (US); Kevin Osborn, Newton, MA (US); Wayne Lutz, Fort Washington, MD (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/609,021

(22) Filed: Mar. 19, 2024

(65) Prior Publication Data

US 2024/0220963 A1    Jul. 4, 2024

Related U.S. Application Data

(63) Continuation of application No. 17/396,086, filed on Aug. 6, 2021, now Pat. No. 11,941,607, which is a
(Continued)

(51) Int. Cl.
*G06Q 20/34* (2012.01)
*G06F 21/31* (2013.01)
(Continued)

(52) U.S. Cl.
CPC ........... *G06Q 20/352* (2013.01); *G06F 21/31* (2013.01); *G06K 19/0716* (2013.01);
(Continued)

(58) Field of Classification Search
CPC ............ G06Q 20/3278; G06Q 20/351; G06Q 20/352; G06Q 20/3552; G06Q 20/4012;
(Continued)

(56) References Cited

U.S. PATENT DOCUMENTS 8,682,802 B1   3/2014  Kannanari
10,482,457 B2  11/2019  Poole et al.
(Continued)

FOREIGN PATENT DOCUMENTS

CN    106576044 A  *  4/2017  ............ G06F 21/31
JP    2002123771 A  *  4/2002
WO    2019031666 A1    2/2019

OTHER PUBLICATIONS

Extended European Search Report for related European Application No. 24195381.9, dated Oct. 11, 2024, 10 pages.

*Primary Examiner* — Mohammad A. Nilforoush
*Assistant Examiner* — Wodajo Getachew
(74) *Attorney, Agent, or Firm* — KDW Firm PLLC

(57) ABSTRACT

Various embodiments are directed to applying, via contactless card authentication, one or more restrictions to a virtual card number and generating the card number for use by a recipient. The one or more restrictions may be specifically personalized to the recipient and may include, for example, a merchant restriction, an amount restriction, a time period restriction, or a location restriction. The generated virtual card number along with the applied one or more restrictions may be consumed in various ways, such as writing the number to a blank card, transmitting the number directly to the recipient's computing device, etc., all via near-field communication.

20 Claims, 11 Drawing Sheets

Related U.S. Application Data continuation of application No. 16/726,210, filed on Dec. 23, 2019, now Pat. No. 11,113,685.

(51) Int. Cl.
| | |
|---|---|
| *G06K 19/07* | (2006.01) |
| *G06Q 20/32* | (2012.01) |
| *G06Q 20/40* | (2012.01) |
| *H04L 9/32* | (2006.01) |
| *G06Q 20/36* | (2012.01) |

(52) U.S. Cl.
CPC ....... *G06Q 20/3278* (2013.01); *G06Q 20/351* (2013.01); *G06Q 20/3552* (2013.01); *G06Q 20/4012* (2013.01); *H04L 9/3234* (2013.01); *G06Q 20/326* (2020.05); *G06Q 20/3272* (2013.01); *G06Q 20/354* (2013.01); *G06Q 20/3563* (2013.01); *G06Q 20/367* (2013.01); *G06Q 20/3672* (2013.01); *G06Q 20/4018* (2013.01)

(58) Field of Classification Search
CPC ............. G06Q 20/326; G06Q 20/3272; G06Q 20/354; G06Q 20/3563; G06Q 20/367; G06Q 20/3672; G06Q 20/4018; H04L 9/3234; G06F 21/31; G06K 19/0716
USPC .......................................................... 705/72
See application file for complete search history.

(56) References Cited

U.S. PATENT DOCUMENTS

| | | | | |
|---|---|---|---|---|
| 2010/0308109 | A1* | 12/2010 | Maddocks | G07F 7/1025 711/E12.001 |
| 2015/0227932 | A1* | 8/2015 | Huxham | G06Q 20/3821 705/76 |
| 2016/0307186 | A1* | 10/2016 | Noë | G06Q 20/3278 |
| 2018/0189527 | A1* | 7/2018 | Kim | G06K 7/10297 |
| 2020/0202329 | A1* | 6/2020 | Yoo | G06F 21/606 |
| 2021/0383378 | A1* | 12/2021 | McCoy | G06Q 20/3825 |

* cited by examiner

CARD ISSUING WITH RESTRICTED VIRTUAL NUMBERS

RELATED APPLICATIONS

This application is a continuation of U.S. patent application Ser. No. 17/396,086, filed on Aug. 6, 2021, which is a continuation of U.S. patent application Ser. No. 16/726,210 (now U.S. Pat. No. 11,113,685), titled "CARD ISSUING WITH RESTRICTED VIRTUAL NUMBERS" filed on Dec. 23, 2019. The contents of the aforementioned application are incorporated herein by reference in their entirety.

BACKGROUND

A virtual credit card is a virtual credit card number typically used for online purchases and single-use transactions. The virtual card number may be a randomly-generated number associated with an actual credit card. Depending on the card issuer, a maximum charge for the virtual number, and in some instances, an expiration date up to a year from the creation of the virtual number may also be set. To an online merchant, the virtual card number may not look different from any other credit card.

Although basic restrictions associated with the virtual card number may be set by the issuer, such as maximum charge amounts and expiration dates, there is a need for restrictions that are specifically personalized to the recipient to be set by an issuing user in a secure manner.

SUMMARY

Various embodiments are directed to applying, via contactless card authentication, one or more restrictions to a virtual card number and generating the card number for use by a recipient. The one or more restrictions may be specifically personalized to the recipient and may include, for example, a merchant restriction, an amount restriction, a time period restriction, or a location restriction. The generated virtual card number along with the applied one or more restrictions may be consumed in various ways, such as writing the number to a blank card, transmitting the number directly to the recipient's computing device, etc., all via near-field communication.

DETAILED DESCRIPTION

Figure 1A:
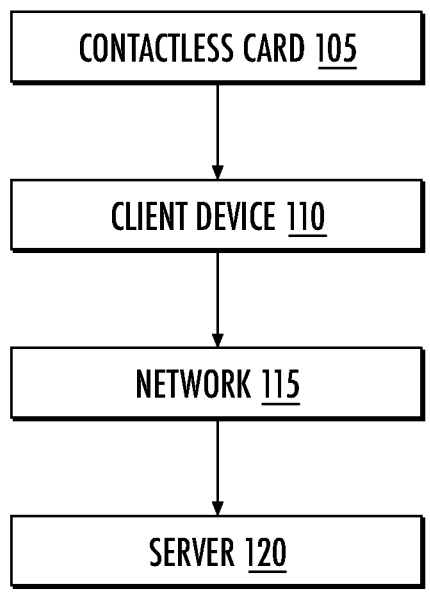
FIG. 1A illustrates an example data transmission system in accordance with one or more embodiments.

Various embodiments are generally directed to generating a virtual card number and applying one or more restrictions to the card number in a personalized and secure manner. In examples, an issuing-user may set restrictions that are personalized to the recipient of the virtual card number, such as a merchant restriction, an amount restriction, a time period restriction, a location restriction, etc. For instance, a user (e.g., parent) may want to leave a babysitter $30 for dinner, but the $30 must be spent at a specific pizza restaurant. In another instance, a user (e.g., business owner) may want to give an employee $5,000 to purchase supplies, but the spending may be limited to two hours and must be spent at a specific supplier.

To create the virtual card number with the one or more restrictions, the user may open a software application (e.g., banking app) and select an icon for generating the virtual card number. According to embodiments, the user may select one or more restrictions to apply to the card number using the software application. The user may then perform one-tap authentication via a contactless card belonging to the user (which may otherwise be known herein as "one-tap contactless card authentication") to finalize and apply the selected restrictions and generate the virtual card number.

In examples, upon generating the virtual card number, the number (with the selected one or more applied restrictions) may be written onto a blank, unlocked card via the software application and activated for use at any point-of-sale system. According to further embodiments, the virtual card number may be transmitted from a first computing device to a second computing device, e.g., from a user computing device to a recipient computing device. The first and second computing devices may be near-field communication (NFC) enabled devices and the virtual card number may be transmitted via NFC.

As will be further described below, one-tap contactless card authentication may be a highly secure way of verifying user identity to ensure, for example, that the restrictions are actually being set by the user and not a fraudster. Moreover, because the contactless card may often times be the payment instrument used to "load" or fund the virtual card number, one-tap authentication ensures that the user is actually the one authorizing the creation and funding of the virtual card number.

According to embodiments, one-tap contactless card authentication may involve the user placing, tapping, or bringing near the contactless card to a designated area of a user computing device (e.g., smartphone). The user computing device may detect the contactless card via near field communication (NFC) and receive one or more cryptograms from the contactless card. Information contained in the cryptogram(s), which may identify the true owner of the contactless card, may be compared or matched against authentication information related to the user signed-in to the banking app. If they match, a successful user identity verification can be confirmed.

As described above, in previous solutions, restrictions placed on virtual card numbers were inflexible and impersonal. The embodiments and examples described herein overcome and are advantageous over the previous solutions in that a user can easily and conveniently personalize and tailor one or more restrictions on a virtual card number based on the recipient of the number. Moreover, the user may be able to write the virtual card number onto a blank unlocked card via the user's computing device and activate the card for the recipient to use at various point-of-sale systems. Further, the user may be able to advantageously transfer the virtual card number from the user's computing device to a recipient computing device via near-field communication. Overall, the application of the one or more restrictions and the generation of the virtual card number may be performed in a highly secure and safe manner via one-tap contactless card authentication.

Reference is now made to the drawings, where like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modification, equivalents, and alternatives within the scope of the claims.

FIG. 1A illustrates an example data transmission system according to one or more embodiments. As further discussed below, system 100 may include contactless card 105, client device 110, network 115, and server 120. Although FIG. 1A illustrates single instances of the components, system 100 may include any number of components.

System 100 may include one or more contactless cards 105, which are further explained below with reference to FIG. 3A and FIG. 3B. In some embodiments, contactless card 105 may be in wireless communication, utilizing NFC in an example, with client device 110.

System 100 may include client device 110, which may be a network-enabled computer. As referred to herein, a network-enabled computer may include, but is not limited to a computer device, or communications device including, e.g., a server, a network appliance, a personal computer, a workstation, a phone, a smartphone, a handheld PC, a personal digital assistant, a thin client, a fat client, an Internet browser, or other device. Client device 110 also may be a mobile computing device, for example, an iPhone, iPod, iPad from Apple® or any other suitable device running Apple's iOS® operating system, any device running Microsoft's Windows® Mobile operating system, any device running Google's Android® operating system, and/or any other suitable mobile computing device, such as a smartphone, a tablet, or like wearable mobile device.

The client device 110 device can include a processor and a memory, and it is understood that the processing circuitry may contain additional components, including processors, memories, error and parity/CRC checkers, data encoders, anti-collision algorithms, controllers, command decoders, security primitives and tamper-proofing hardware, as necessary to perform the functions described herein. The client device 110 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touchscreen, microphone, digital camera, video recorder or camcorder. These devices may be used to enter information and interact with the software and other devices described herein.

In some examples, client device 110 of system 100 may execute one or more applications, such as software applications, that enable, for example, network communications with one or more components of system 100 and transmit and/or receive data.

Client device 110 may be in communication with one or more servers 120 via one or more networks 115 and may operate as a respective front-end to back-end pair with server 120. Client device 110 may transmit, for example from a mobile device application executing on client device 110, one or more requests to server 120. The one or more requests may be associated with retrieving data from server 120. Server 120 may receive the one or more requests from client device 110. Based on the one or more requests from client device 110, server 120 may be configured to retrieve the requested data from one or more databases (not shown). Based on receipt of the requested data from the one or more databases, server 120 may be configured to transmit the received data to client device 110, the received data being responsive to one or more requests.

System 100 may include one or more networks 115. In some examples, network 115 may be one or more of a wireless network, a wired network or any combination of wireless network and wired network and may be configured to connect client device 110 to server 120. For example, network 115 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 115 may include, without limitation, telephone lines, fiber optics, IEEE Ethernet 802.3, a wide area network, a wireless personal area network, a LAN, or a global network such as the Internet. In addition, network 115 may support an Internet network, a wireless communication network, a cellular network, or the like, or any combination thereof. Network 115 may further include one network, or any number of the exemplary types of networks mentioned above, operating as a stand-alone network or in cooperation with each other. Network 115 may utilize one or more protocols of one or more network elements to which they are communicatively coupled. Network 115 may translate to or from other protocols to one or more protocols of network devices. Although network 115 is depicted as a single network, it should be appreciated that according to one or more examples, network 115 may include a plurality of interconnected networks, such as, for example, the Internet, a service provider's network, a cable television network, corporate networks, such as credit card association networks, and home networks.

System 100 may include one or more servers 120. In some examples, server 120 may include one or more processors, which are coupled to memory. Server 120 may be configured as a central system, server or platform to control and call various data at different times to execute a plurality of workflow actions. Server 120 may be configured to connect to the one or more databases. Server 120 may be connected to at least one client device 110.

Figure 1B:
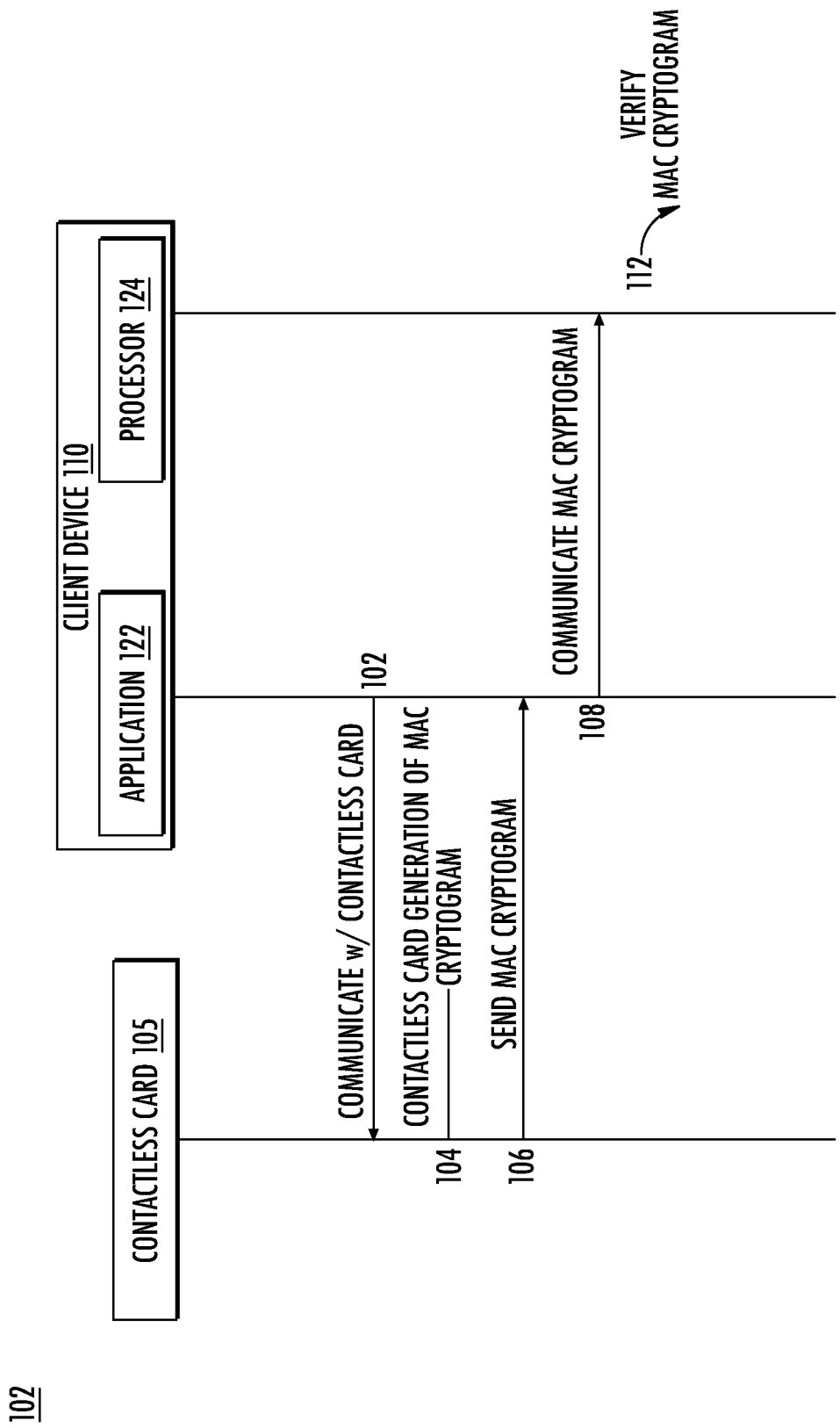
FIG. 1B illustrates an example sequence diagram for providing authenticated access in accordance with one or more embodiments.

FIG. 1B illustrates an example sequence diagram for providing authenticated access according to one or more embodiments. The diagram may include contactless card 105 and client device 110, which may include an application 122 and processor 124. FIG. 1B may reference similar components as illustrated in FIG. 1A.

At step 102, the application 122 communicates with the contactless card 105 (e.g., after being brought near the contactless card 105). Communication between the application 122 and the contactless card 105 may involve the contactless card 105 being sufficiently close to a card reader (not shown) of the client device 110 to enable NFC data transfer between the application 122 and the contactless card 105.

At step 104, after communication has been established between client device 110 and contactless card 105, the contactless card 105 generates a message authentication code (MAC) cryptogram. In some examples, this may occur when the contactless card 105 is read by the application 122. In particular, this may occur upon a read, such as an NFC read, of a near field data exchange (NDEF) tag, which may be created in accordance with the NFC Data Exchange Format.

For example, a reader, such as application 122, may transmit a message, such as an applet select message, with the applet ID of an NDEF producing applet. Upon confirmation of the selection, a sequence of select file messages followed by read file messages may be transmitted. For example, the sequence may include "Select Capabilities file," "Read Capabilities file," and "Select NDEF file." At this point, a counter value maintained by the contactless card 105 may be updated or incremented, which may be followed by "Read NDEF file." At this point, the message may be generated which may include a header and a shared secret. Session keys may then be generated. The MAC cryptogram may be created from the message, which may include the header and the shared secret. The MAC cryptogram may then be concatenated with one or more blocks of random data, and the MAC cryptogram and a random number (RND) may be encrypted with the session key. Thereafter, the cryptogram and the header may be concatenated, and encoded as ASCII hex and returned in NDEF message format (responsive to the "Read NDEF file" message).

In some examples, the MAC cryptogram may be transmitted as an NDEF tag, and in other examples the MAC cryptogram may be included with a uniform resource indicator (e.g., as a formatted string).

In some examples, application 122 may be configured to transmit a request to contactless card 105, the request comprising an instruction to generate a MAC cryptogram.

At step 106, the contactless card 105 sends the MAC cryptogram to the application 122. In some examples, the transmission of the MAC cryptogram occurs via NFC, however, the present disclosure is not limited thereto. In other examples, this communication may occur via Bluetooth, Wi-Fi, or other means of wireless data communication.

At step 108, the application 122 communicates the MAC cryptogram to the processor 124. At step 112, the processor 124 verifies the MAC cryptogram pursuant to an instruction from the application 122. For example, the MAC cryptogram may be verified, as explained below.

In some examples, verifying the MAC cryptogram may be performed by a device other than client device 110, such as a server 120 in data communication with the client device 110 (as shown in FIG. 1A). For example, processor 124 may output the MAC cryptogram for transmission to server 120, which may verify the MAC cryptogram.

In some examples, the MAC cryptogram may function as a digital signature for purposes of verification. Other digital signature algorithms, such as public key asymmetric algorithms, e.g., the Digital Signature Algorithm and the RSA algorithm, or zero knowledge protocols, may be used to perform this verification.

It may be understood that in some examples, the contactless card 105 may initiate communication after the contactless card is brought near the client device 110. By way of example, the contactless card 105 may send the client device 110 a message, for instance, indicating that the contactless card has established communication. Thereafter, the application 122 of client device 110 may proceed to communicate with the contactless card at step 102, as described above.

Figure 2:
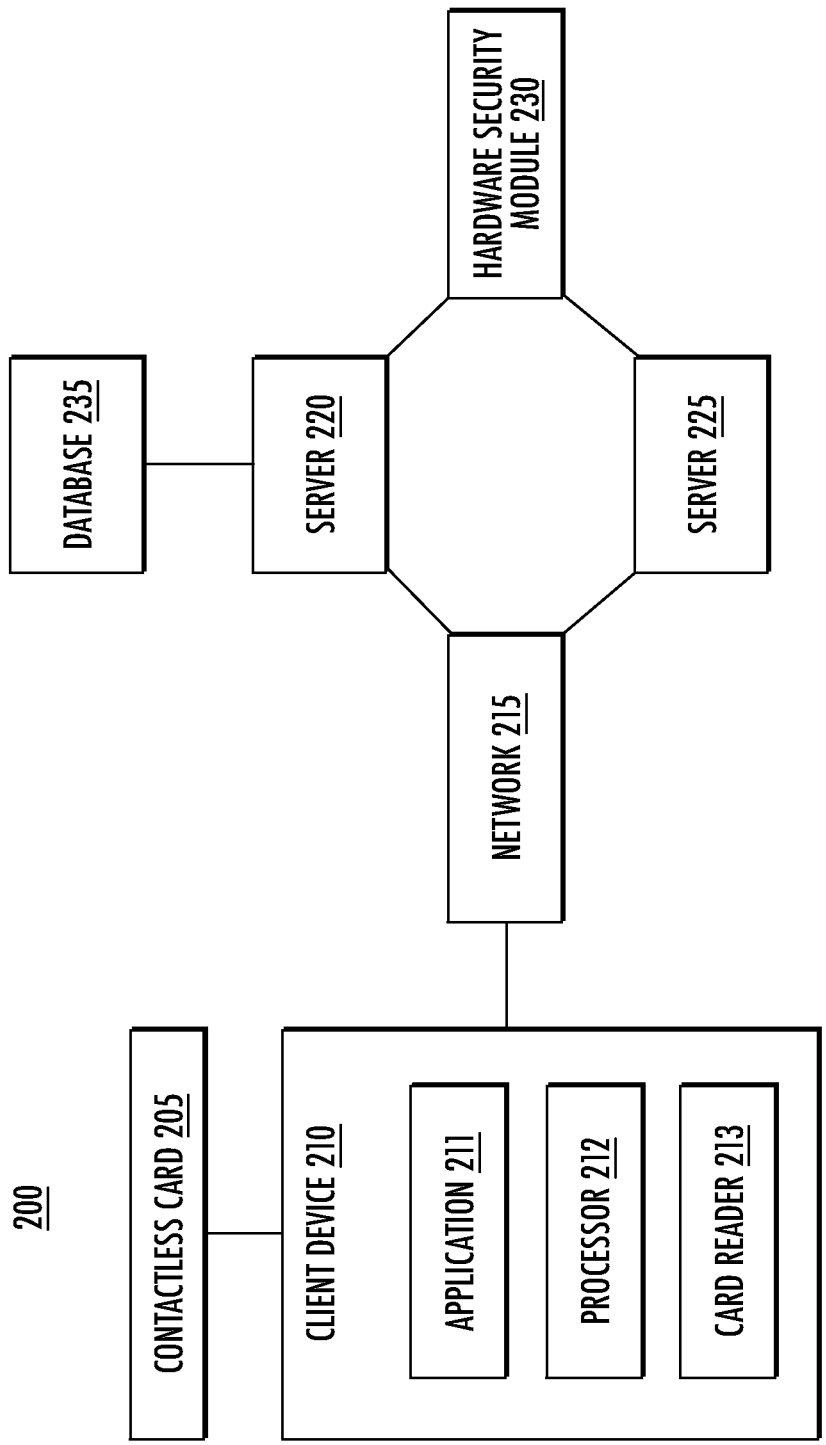
FIG. 2 illustrates an example system using a contactless card in accordance with one or more embodiments.

FIG. 2 illustrates an example system 200 using a contactless card. System 200 may include a contactless card 205, one or more client devices 210, network 215, servers 220, 225, one or more hardware security modules 230, and a database 235. Although FIG. 2 illustrates single instances of the components, system 200 may include any number of components.

System 200 may include one or more contactless cards 205, which are further explained below with respect to FIG. 3A and FIG. 3B. In some examples, contactless card 205 may be in wireless communication, for example NFC communication, with client device 210. For example, contactless card 205 may include one or more chips, such as a radio frequency identification chip, configured to communication via NFC or other short-range protocols. In other embodiments, contactless card 205 may communicate with client device 210 through other means including, but not limited to, Bluetooth, satellite, Wi-Fi, wired communications, and/or any combination of wireless and wired connections. According to some embodiments, contactless card 205 may be configured to communicate with card reader 213 (which may otherwise be referred to herein as NFC reader, NFC card reader, or reader) of client device 210 through NFC when contactless card 205 is within range of card reader 213. In other examples, communications with contactless card 205 may be accomplished through a physical interface, e.g., a universal serial bus interface or a card swipe interface.

System 200 may include client device 210, which may be a network-enabled computer. As referred to herein, a network-enabled computer may include, but is not limited to: e.g., a computer device, or communications device including, e.g., a server, a network appliance, a personal computer, a workstation, a mobile device, a phone, a handheld PC, a personal digital assistant, a thin client, a fat client, an Internet browser, or other device. One or more client devices 210 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone or like wearable mobile device. In some examples, the client device 210 may be the same as, or similar to, a client device 110 as described with reference to FIG. 1A or FIG. 1B.

Client device 210 may be in communication with one or more servers 220 and 225 via one or more networks 215. Client device 210 may transmit, for example from an application 211 executing on client device 210, one or more requests to one or more servers 220 and 225. The one or more requests may be associated with retrieving data from one or more servers 220 and 225. Servers 220 and 225 may receive the one or more requests from client device 210. Based on the one or more requests from client device 210, one or more servers 220 and 225 may be configured to retrieve the requested data from one or more databases 235. Based on receipt of the requested data from the one or more databases 235, one or more servers 220 and 225 may be configured to transmit the received data to client device 210, the received data being responsive to one or more requests.

System 200 may include one or more hardware security modules (HSM) 230. For example, one or more HSMs 230 may be configured to perform one or more cryptographic operations as disclosed herein. In some examples, one or more HSMs 230 may be configured as special purpose security devices that are configured to perform the one or more cryptographic operations. The HSMs 230 may be configured such that keys are never revealed outside the HSM 230, and instead are maintained within the HSM 230. For example, one or more HSMs 230 may be configured to perform at least one of key derivations, decryption, and MAC operations. The one or more HSMs 230 may be contained within, or may be in data communication with, servers 220 and 225.

System 200 may include one or more networks 215. In some examples, network 215 may be one or more of a wireless network, a wired network or any combination of wireless network and wired network, and may be configured to connect client device 210 to servers 220 and/or 225. For example, network 215 may include one or more of a fiber optics network, a passive optical network, a cable network, a cellular network, an Internet network, a satellite network, a wireless LAN, a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, RFID, Wi-Fi, and/or any combination of networks thereof. As a non-limiting example, communications from contactless card 205 and client device 210 may include NFC communication, cellular network between client device 210 and a carrier, and Internet between the carrier and a back-end.

In addition, network 215 may include, without limitation, telephone lines, fiber optics, IEEE Ethernet 802.3, a wide area network, a wireless personal area network, a local area network, or a global network such as the Internet. In addition, network 215 may support an Internet network, a wireless communication network, a cellular network, or the like, or any combination thereof. Network 215 may further include one network, or any number of the exemplary types of networks mentioned above, operating as a stand-alone network or in cooperation with each other. Network 215 may utilize one or more protocols of one or more network elements to which they are communicatively coupled. Network 215 may translate to or from other protocols to one or more protocols of network devices. Although network 215 is depicted as a single network, it should be appreciated that according to one or more examples, network 215 may include a plurality of interconnected networks, such as, for example, the Internet, a service provider's network, a cable television network, corporate networks, such as credit card association networks, and home networks.

In various examples according to the present disclosure, client device 210 of system 200 may execute one or more applications 211, and include one or more processors 212, and one or more card readers 213. For example, one or more applications 211, such as software applications, may be configured to enable, for example, network communications with one or more components of system 200 and transmit and/or receive data. It is understood that although only single instances of the components of client device 210 are illustrated in FIG. 2, any number of devices 210 may be used. Card reader 213 may be configured to read from and/or communicate with contactless card 205. In conjunction with the one or more applications 211, card reader 213 may communicate with contactless card 205. In examples, the card reader 213 may include circuitry or circuitry components, e.g., NFC reader coil, that generates a magnetic field to allow communication between the client device 210 and the contactless card 205.

The application 211 of any of client device 210 may communicate with the contactless card 205 using short-range wireless communication (e.g., NFC). The application 211 may be configured to interface with a card reader 213 of client device 210 configured to communicate with a contactless card 205. As should be noted, those skilled in the art would understand that a distance of less than twenty centimeters is consistent with NFC range.

In some embodiments, the application 211 communicates through an associated reader (e.g., card reader 213) with the contactless card 205.

In some embodiments, card activation may occur without user authentication. For example, a contactless card 205 may communicate with the application 211 through the card reader 213 of the client device 210 through NFC. The communication (e.g., a tap of the card proximate the card reader 213 of the client device 210) allows the application 211 to read the data associated with the card and perform an activation. In some cases, the tap may activate or launch application 211 and then initiate one or more actions or communications with an account server 225 to activate the card for subsequent use. In some cases, if the application 211 is not installed on client device 210, a tap of the card against the card reader 213 may initiate a download of the application 211 (e.g., navigation to an application download page). Subsequent to installation, a tap of the card may activate or launch the application 211, and then initiate (e.g., via the application or other back-end communication) activation of the card. After activation, the card may be used in various transactions including commercial transactions.

According to some embodiments, the contactless card 205 may include a virtual payment card. In those embodiments, the application 211 may retrieve information associated with the contactless card 205 by accessing a digital wallet implemented on the client device 210, wherein the digital wallet includes the virtual payment card. In some examples, virtual payment card data may include one or more static or dynamically generated virtual card numbers.

Server 220 may include a web server in communication with database 235. Server 225 may include an account server. In some examples, server 220 may be configured to validate one or more credentials from contactless card 205 and/or client device 210 by comparison with one or more credentials in database 235. Server 225 may be configured to authorize one or more requests, such as payment and transaction, from contactless card 205 and/or client device 210.

Figure 3A:
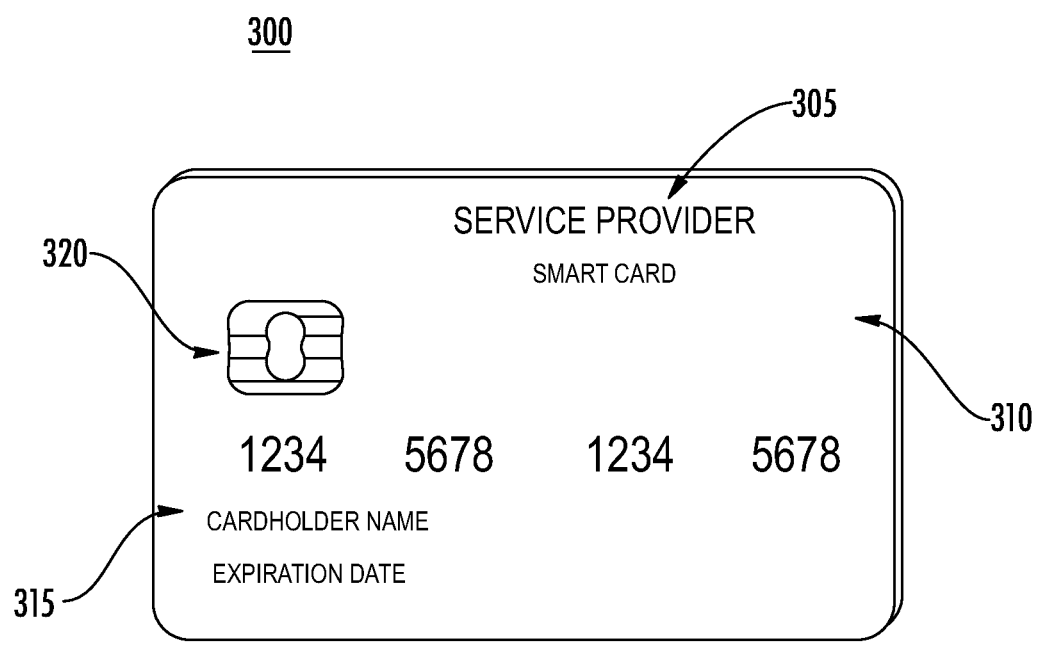
FIG. 3A illustrates an example contactless card in accordance with one or more embodiments.

FIG. 3A illustrates one or more contactless cards 300, which may include a payment card, such as a credit card, debit card, or gift card, issued by a service provider 305 displayed on the front or back of the card 300. In some examples, the contactless card 300 is not related to a payment card, and may include, without limitation, an identification card. In some examples, the payment card may include a dual interface contactless payment card. The contactless card 300 may include a substrate 310, which may include a single layer, or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 300 may have physical characteristics compliant with the ID-1 format of the ISO/IEC 7810 standard, and the contactless card may otherwise be compliant with the ISO/IEC 14443 standard. However, it is understood that the contactless card 300 according to the present disclosure may have different characteristics, and the present disclosure does not require a contactless card to be implemented in a payment card.

The contactless card 300 may also include identification information 315 displayed on the front and/or back of the card, and a contact pad 320. The contact pad 320 may be configured to establish contact with another communication device, such as a user device, smart phone, laptop, desktop, or tablet computer. The contactless card 300 may also include processing circuitry, antenna and other components not shown in FIG. 3A. These components may be located behind the contact pad 320 or elsewhere on the substrate 310. The contactless card 300 may also include a magnetic strip or tape, which may be located on the back of the card (not shown in FIG. 3A).

Figure 3B:
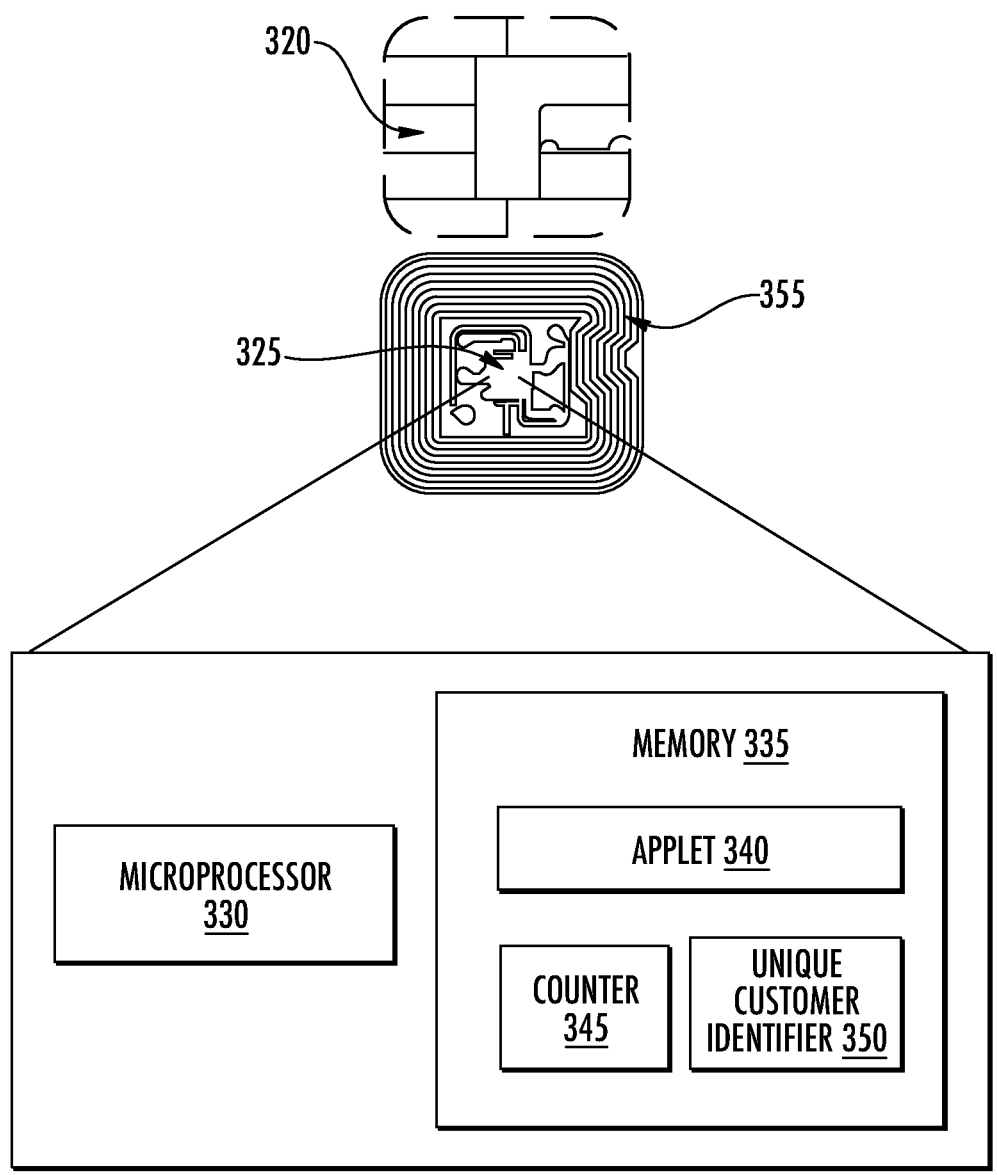
FIG. 3B illustrates an example contact pad of a contactless card in accordance with one or more embodiments.

As illustrated in FIG. 3B, the contact pad 320 of FIG. 3A may include processing circuitry 325 for storing and processing information, including a microprocessor 330 and a memory 335. It is understood that the processing circuitry 325 may contain additional components, including processors, memories, error and parity/CRC checkers, data encoders, anti-collision algorithms, controllers, command decoders, security primitives and tamper-proofing hardware, as necessary to perform the functions described herein.

The memory 335 may be a read-only memory, write-once read-multiple memory or read/write memory, e.g., RAM, ROM, and EEPROM, and the contactless card 300 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. It may also be read many times.

The memory 335 may be configured to store one or more applets 340, one or more counters 345, one or more diversified keys 347, and a customer identifier 350. The one or more applets 340 may include one or more software applications configured to execute on one or more contactless cards, such as Java Card applet. However, it is understood that applets 340 are not limited to Java Card applets, and instead may be any software application operable on contactless cards or other devices having limited memory. The one or more counters 345 may include a numeric counter sufficient to store an integer. As will be further described below, the one or more diversified keys 347 may be used to encrypt various information, such as information about the user or customer (e.g., customer identifier 450) to generate cryptogram(s) that can be sent to, for example, a mobile device for at least authentication purposes. The customer identifier 350 may include a unique alphanumeric identifier assigned to a user of the contactless card 300, and the identifier may distinguish the user of the contactless card from other contactless card users. In some examples, the customer identifier 350 may identify both a customer and an account assigned to that customer and may further identify the contactless card associated with the customer's account.

The processor and memory elements of the foregoing exemplary embodiments are described with reference to the contact pad, but the present disclosure is not limited thereto. It is understood that these elements may be implemented outside of the pad 320 or entirely separate from it, or as further elements in addition to processor 330 and memory 335 elements located within the contact pad 320.

In some examples, the contactless card 300 may include one or more antennas 355. The one or more antennas 355 may be placed within the contactless card 300 and around the processing circuitry 325 of the contact pad 320. For example, the one or more antennas 355 may be integral with the processing circuitry 325 and the one or more antennas 355 may be used with an external booster coil. As another example, the one or more antennas 355 may be external to the contact pad 320 and the processing circuitry 325.

In an embodiment, the coil of contactless card 300 may act as the secondary of an air core transformer. The terminal may communicate with the contactless card 300 by cutting power or amplitude modulation. The contactless card 300 may infer the data transmitted from the terminal using the gaps in the contactless card's power connection, which may be functionally maintained through one or more capacitors. The contactless card 300 may communicate back by switching a load on the contactless card's coil or load modulation. Load modulation may be detected in the terminal's coil through interference.

As explained above, the contactless cards 300 may be built on a software platform operable on smart cards or other devices having limited memory, such as JavaCard, and one or more or more applications or applets may be securely executed. Applets may be added to contactless cards to provide a one-time password (OTP) for multifactor authentication (MFA) in various mobile application-based use cases. Applets may be configured to respond to one or more requests, such as near field data exchange requests, from a reader, such as a mobile NFC reader, and produce an NDEF message that includes a cryptographically secure OTP encoded as an NDEF text tag.

In examples, when preparing to send data (e.g., to a mobile device, to a server, etc.), the contactless card 300 may increment a counter value of a counter of the one or more counters 345. The contactless card 300 may then provide a master key, which may be a distinct key stored on the card 300, and the counter value as input to a cryptographic algorithm, which produces a diversified key as output, which may be one of the diversified keys 347. It is understood that the master key and the counter value is also stored in memory of a device or component receiving data from the contactless card 300 so as to decrypt the data using the diversified key that was used by the card to encrypt the transmitted data. The cryptographic algorithm may include encryption algorithms, hash-based message authentication code (HMAC) algorithms, cipher-based message authentication code (CMAC) algorithms, and the like. Non-limiting examples of the cryptographic algorithm may include a symmetric encryption algorithm such as 3DES or AES128; a symmetric HMAC algorithm, such as HMAC-SHA-256;

and a symmetric CMAC algorithm such as AES-CMAC. The contactless card 300 may then encrypt the data (e.g., the customer identifier 350 and any other data) using the diversified key in the form of one or more cryptograms that can be sent to a mobile device, for example, as NFC data exchange format (NDEF) messages. The contactless card 300 may then transmit the encrypted data (e.g., cryptograms) to the mobile device, which can then decrypt the cryptograms using the diversified key (e.g., the diversified key generated by the mobile device using the counter value and the master key stored in memory thereof).

Figure 4:
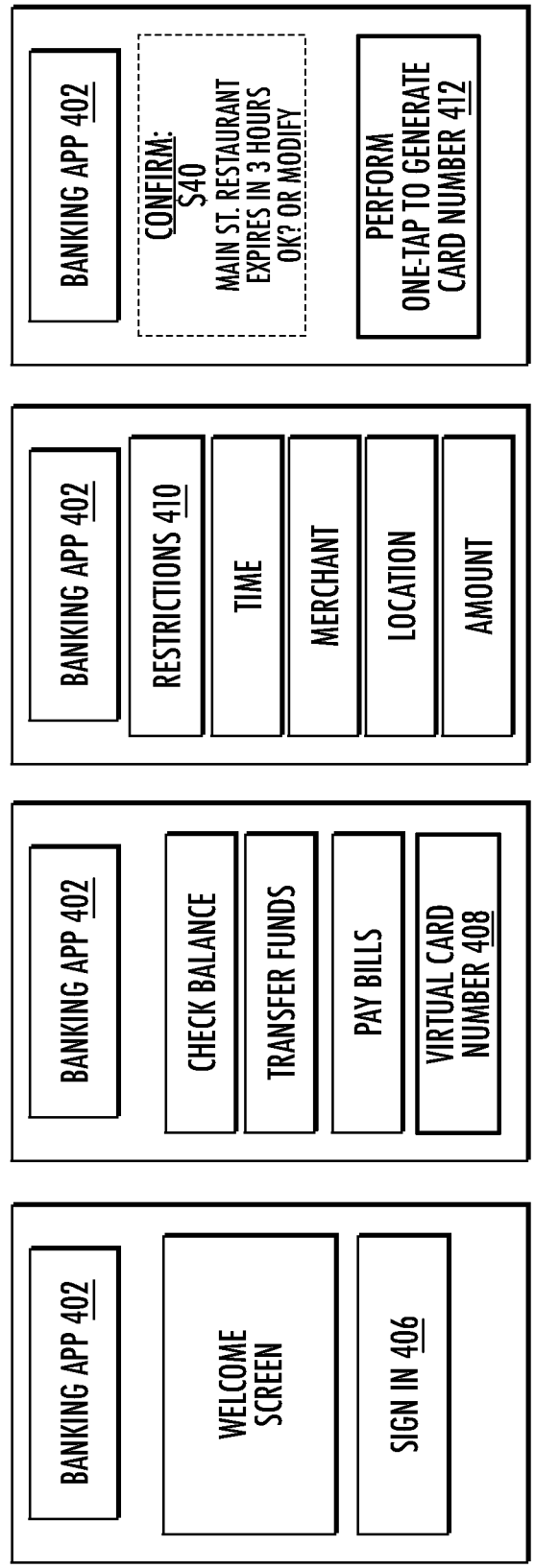
FIG. 4 illustrates an example flow of generating a virtual card number and associated restrictions in accordance with one or more embodiments.

FIG. 4 illustrates an example flow 400 of generating a virtual card number and associated restrictions according to one or more embodiments. The user may open a banking application 402 (which may otherwise be referred to herein as a "banking app") using a mobile computing device. As shown, the banking app 402 may display at least a welcome screen and an icon 406 for signing-in. The user may sign in to the user's account by entering a username and password or may gain access to the account in any other suitable manner, such as tapping the user's contactless card onto the mobile computing device. It may be understood that tapping the user's contactless card to sign-in may be performed and may operate in a similar manner to the one-tap authentication process, which will be further described below. It may also be understood that the banking app may be any software application, such as a mobile-based application, a native application, a web application, or a web browser.

Upon signing-in to the user's account, the banking app 402 may display and allow the user to select various account-related tasks, such as checking account balances, transferring funds between accounts, paying bills, and generating a virtual card number, as shown by icon 408. The user may select icon 408, as shown by the highlighted box, to generate a virtual card number and one or more restrictions associated therewith. In some examples, the user may also enter and identify the recipient of the virtual card number in the event that the recipient may also be a banking customer. It may be understood that the virtual card number may be funded, loaded, or linked to a user account, which may be associated with the user's contactless card. In examples, the user account may be a money account, a checking account, a credit card account, a debit card account, a digital wallet account, a cryptocurrency account, etc.

As further shown, the banking app 402 may display possible restriction options 410. For example, the user may select the "time" icon to set various types of time-related restrictions on the virtual card number, such as an expiration time, a time period that the virtual card number can be used, a specific date range that the number will be active, etc. The user may also select the "merchant" icon, which may be used to set any type of merchant-related restriction, such as limiting the use of the virtual card number to a specific store, restaurant, supplier, etc. Moreover, the user may select the "location" icon, which may limit the use of the virtual card number to a geographical location, such as a specific zip code, city, town, state, etc. Further, as shown by the bottom-most icon, an "amount" icon may be selected to set amount-related restrictions, such as monetary amounts down to an exact dollar and cent (or any other currency) value. It may be understood that when the user selects any of the displayed restriction options 410, the user may manually enter the restrictions and/or select pre-selected or pre-chosen restrictions. Advantageously, in this manner, the one or more restrictions that the user can set are more personalized, flexible, and specific to the recipient, which provides the user more control over the virtual card number.

In some examples, the banking app 402 may make restriction suggestions for the user based on data related to the user, and if applicable, data related to the recipient. For instance, if the user has only a certain amount of money in the user's account that the user desires to use to fund or load the virtual card number, then an amount restriction may be suggested that does not exceed that available amount in the user's account. In another instance, if the recipient is also a banking customer, financial data associated with the recipient may be analyzed to determine, for example, what kind of food the recipient likes or the restaurants the user frequents to suggest a merchant or location restriction.

In one restriction example, the user may generate a virtual card number for a daughter going out to eat dinner with her friends at Main Street Restaurant. The user may set various restrictions on the virtual card number: at least a merchant restriction set to Main Street Restaurant, an amount restriction of $40, and a time restriction of a three-hour use period. As shown in the dashed-box, the banking app 402 may display all of the selected restrictions and request confirmation from the user that the information is correct. If changes are necessary, the user may modify the restrictions. Upon confirming that the restrictions are correct, the user may select icon 412 to perform one-tap contactless card authentication to generate the virtual card number. In some examples, the one-tap authentication process may automatically begin upon the user confirming the restrictions.

Figure 5:
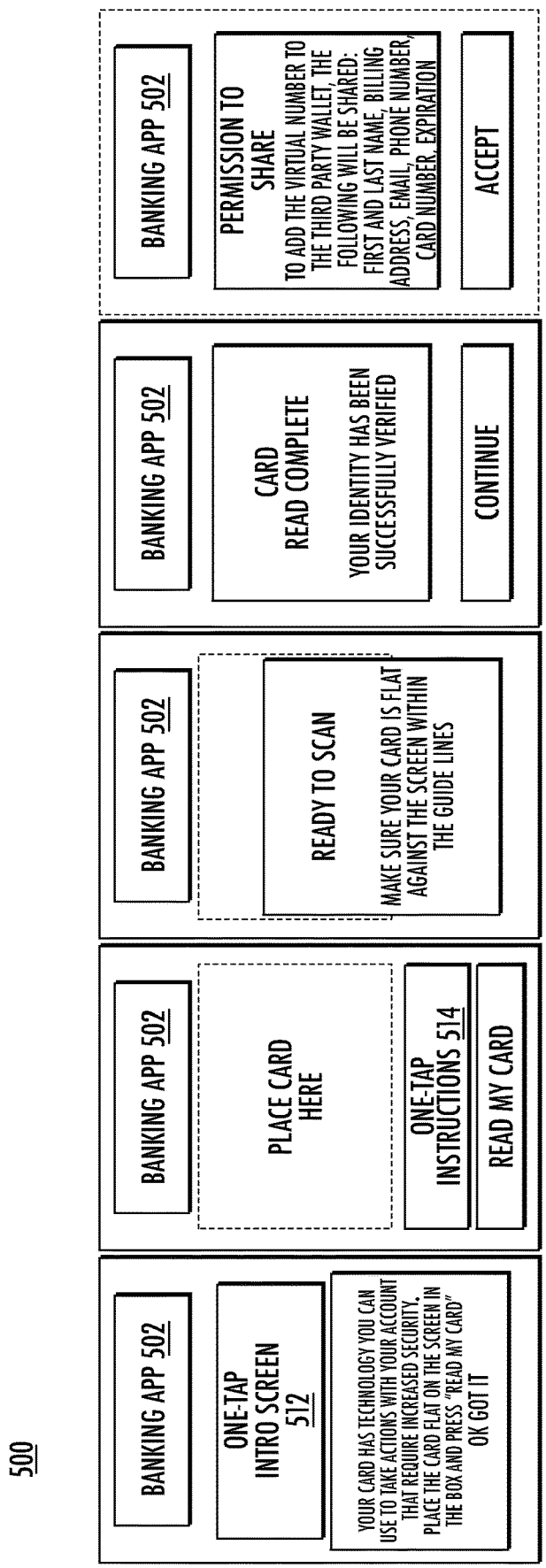
FIG. 5 illustrates an example flow of one-tap authentication in accordance with one or more embodiments.

FIG. 5 illustrates an example flow 500 of one-tap contactless card authentication according to one or more embodiments. As described above, the example one-tap authentication flow 600 may begin, for example, upon the user selecting or pressing icon 412 for generating the virtual card number with the selected restrictions shown in FIG. 4.

As illustrated, a banking app 502 (which may be similar or identical to the banking app 402) may display a one-tap introduction screen 512 and related background information to situate the user for performing the one-tap authentication. For example, the background information may state that the user's contactless card has technology that can be used to take actions that require increased security and further indicate that the card may be placed flat on the screen of the computing device to proceed with the authentication process. The user may select or press the "OK got it" icon to continue.

In examples, upon the user selecting or pressing the "OK got it" icon, the banking app 502 may then display a designated area, which is outlined by the dashed box, where the user can place or tap a contactless card. It may be understood that the contactless card may be similar or identical to the contactless card 300 described above. It may further be understood, as described above, that the user's contactless card being used to perform the one-tap authentication may be the financial instrument used to "fund" or "load" the virtual card number.

Moreover, one-tap authentication instructions 514 may be displayed, or alternatively, an icon or link to the one-tap instructions 514 may be provided. The instructions 514 may include at least step-by-step directions for performing the one-tap authentication. For example, the user may be instructed to select or press the "read my card" icon and then to place or tap the contactless card within the dashed guide lines of the "place card here" box. When the "read my card" icon is pressed, the banking app 502 may further display an indication that the user's contactless card is ready to scan. In some examples, if the computing device is unable to read the contactless card via NFC, the banking app 502 may instruct the user to retry the card scan. It may be understood that the contactless card can be placed anywhere on the user computing device, such as the rear or any place near the NFC reader, and not just the front of the device.

According to embodiments, when the user computing device detects the contactless card via NFC, the computing device may receive one or more cryptograms from the contactless card. It may be understood that a cryptogram may broadly refer to any encrypted text, data, or information. It may further be understood that the one or more cryptograms may be received as NFC data exchange format (NDEF) messages.

In examples, the one or more received cryptograms may contain information at least identifying the user or other related information indicating that the card belongs to a particular user. For instance, the card-user information may be any type of data or information (e.g., ID number, customer number, etc.) associating the contactless card to the user, which may be created or established when the contactless card is created for the user and/or at backend systems when the user signs up or applies for the contactless card. Afterwards, the information contained in the one or more received cryptograms may be matched or compared against authentication information associated with the user to verify the identity of the user. The authentication information is any type of data or information identifying the user signed-in to the banking app (e.g., ID number, customer number, etc.).

In one example, the banking app 502 may be configured to decrypt the one or more cryptograms received from the contactless card using at least one key (e.g., a private key, a decryption key, a key corresponding to a specific encryption-decryption scheme). The banking app 502 may securely access or receive authentication information related to the user from one or more remote computing devices, such as backend servers. The authentication information may contain at least an identifier or any information indicating the identity of the user logged into the banking app 502. The banking app 502 may then determine whether the received authentication information and the decrypted cryptogram information received from the contactless card match to verify that the contactless card actually belongs to the user and/or to verify that the user is actually the user claims to be.

In another example, the banking app 502 may receive the one or more cryptograms from the contactless card and send the cryptogram(s) to one or more remote computing devices, which may be secure backend servers, to perform the decryption of the cryptograms and determine whether the information contained in the one or more cryptograms match authentication information related to the user. The one or more remote computing devices may then send to banking app 502 an indication or confirmation of verification of the user's identity. In at least that regard, most (if not all) of the identity verification process may be performed at one or more secure and remote computing devices, which may be advantageous in certain applications or use cases.

Upon successful verification and authentication of the user's identity, the banking app 502 may display an indication that the contactless card has been read and the identity of the user has been successfully verified. The user may then select or press the "continue" icon, which allows the banking app 502 to generate the virtual card number having the one or more above-selected restrictions.

In some examples, the banking app 502 may ask the user for permission to share user-related data with third-party services, such as third-party wallets, if, for instance, the virtual card number is being sent to a third-party wallet (e.g., recipient third-party wallet). The user-related data may include the user's first name, middle name, last name, billing address, email address, phone number(s), card number(s), card expiration information, etc. Moreover, in additional examples, the user may be prompted to accept one or more terms and/or conditions related to forwarding the virtual card number to the third-party wallet. The user may select or press the "accept" icon, as shown, to proceed. Thereafter, the banking app 502 may generate the virtual card number with the one or more applied restrictions and may be ready for use by the recipient.

Although FIG. 4 and FIG. 5 show the one-tap contactless card authentication being performed after the user has selected the one or more restrictions to be applied to the virtual card number, in further embodiments, the one-tap authentication process may be performed prior to the user selecting the restriction(s). For example, the user may open the banking app and select an icon to generate a virtual card number. At this point, the user may be prompted to perform the one-tap authentication before selecting the restrictions and generating the virtual card number.

Figure 6:
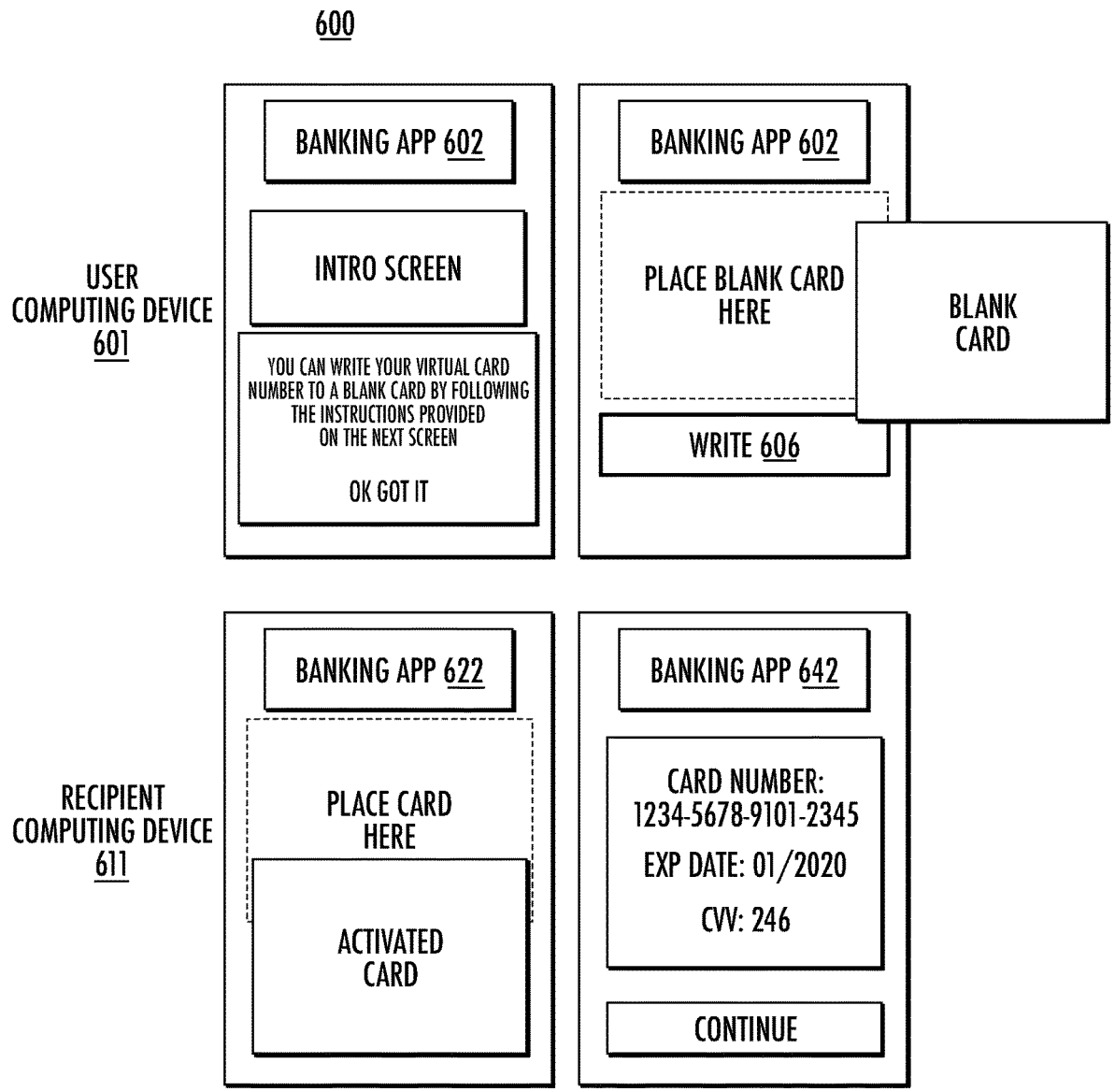
FIG. 6 illustrate example flows of writing a virtual card number to a blank card via a user computing device and using the card via a recipient computing device in accordance with one or more embodiments.

FIG. 6 illustrate example flows 600 of writing a virtual card number to a blank card via a user computing device 601 and using the card via a recipient computing device 611 according to one or more embodiments. It may be understood that the user computing device 601 and the recipient computing device 611 may be any type of NFC-enabled or NFC-compatible devices. After a virtual card number with the one or more restrictions has been generated by the user computing device 601 in accordance with the flows and/or processes described above, the user may write the virtual card number (along with the associated restrictions) onto a blank, unlocked NFC-enabled card.

As shown, the banking app 602 (which, again, may be similar or identical to the above-described banking apps 402 and 502) may display an intro screen and instructions or information regarding the writing process. For example, the app 602 may indicate that the generated virtual card number may be written to a blank card by placing the blank card within the dashed guide lines on the next screen. It may be understood that the blank card may be a blank unlocked NFC-enabled card that allows information related to the virtual card number and associated restrictions to be securely received from the user computing device 601 via near-field communication.

As further shown, the banking app 602 may display the dashed guide lines so that the user can place the blank card near or on the screen (or anywhere near the NFC reader of the user computing device 601, e.g., rear, side of the device) and press or select icon 606 for writing the virtual card number. When icon 606 is pressed or selected, the computing device 601 may detect the blank card via an NFC reader and associated NFC circuitry and the virtual card number may be written to the blank card as an NFC data exchange format (NDEF) tag. After writing the virtual card number to the blank card, the card may then be activated for use at any point-of-sale system or any NFC-enabled device, the details of which will be further described below with respect to at least FIG. 8. It may be understood that the activated card may be referred to as an "active" card.

At the recipient computing device 611, the recipient may open a banking app 622 and tap the active card to receive, process, and use or consume the virtual card number, as illustrated. For example, upon receiving the virtual card number after tapping the active card, the recipient computing device 611 may copy-and-paste, populate, or autopopulate relevant payment information associated with the virtual card number at any web-based application or website, such as merchant website 642. It may be understood that any purchases or transactions made on the website 642 are still constrained by the restrictions set by the user, as described above. In another example, the virtual card number may be added and provisioned to a third-party digital wallet. In yet other examples, the user may physically use the active card at numerous point-of-sale systems and NFC-enabled devices, such as brick-and-mortar stores.

Figure 7:
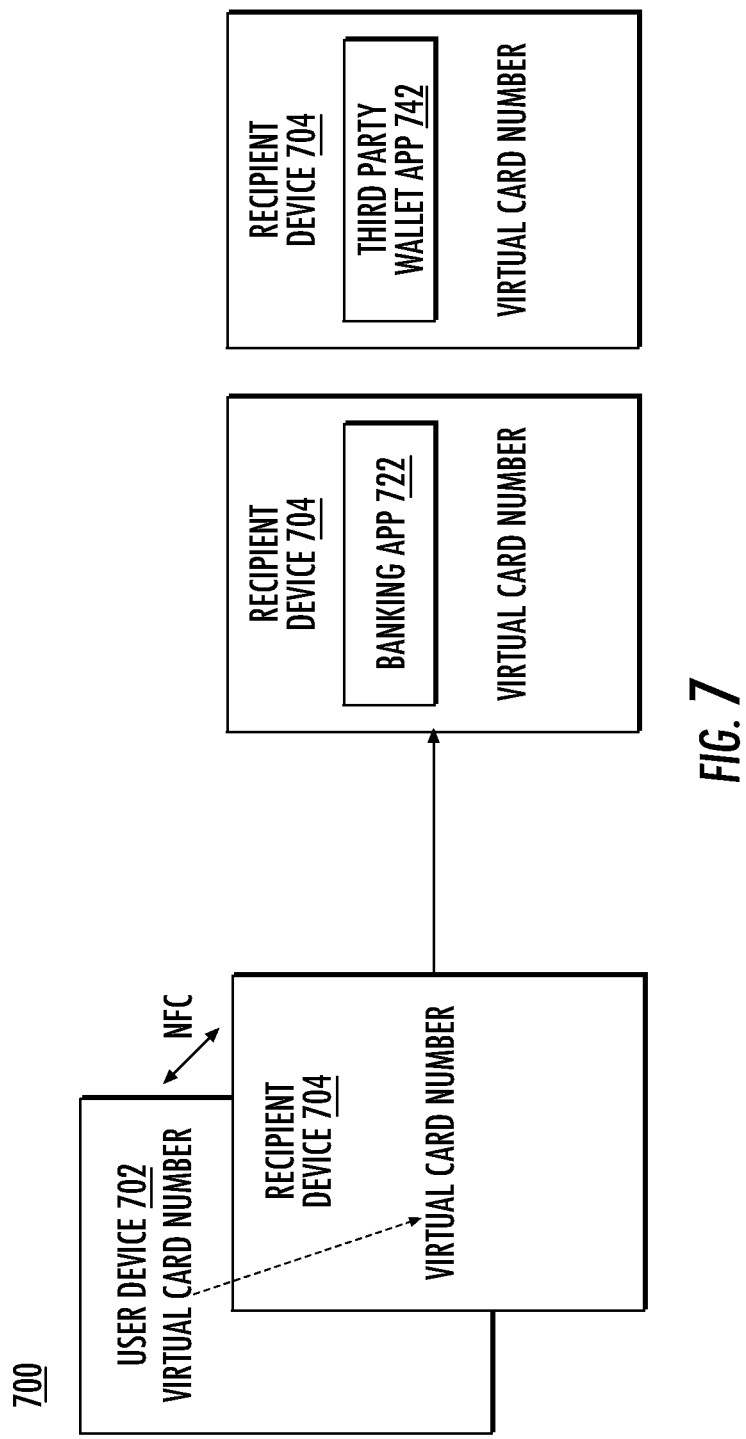
FIG. 7 illustrates an example process of transferring a virtual card number between two computing devices in accordance with one or more embodiments.

FIG. 7 illustrates an example process 700 of transferring a virtual card number from a user computing device 702 to a recipient computing device 704 according to one or more embodiments. The user and recipient computing devices 702 and 704 may be NFC-enabled or NFC-compatible devices. As shown, the user device 702 may be tapped to the recipient device 704 (or vice versa) to transfer the virtual card number from the user device 702 to the recipient device 704 via near-field communication. Similar to the process of writing a virtual card number to a blank card, the virtual card number may be transferred between at least the two devices via respective banking apps.

Upon transferring the virtual card number, the recipient device 704 can consume the number in various ways. For example, as shown, a banking app 722 may be used by the recipient to process the virtual card number and copy-paste or populate payment fields of a merchant web-based application or website in accordance with the restriction(s) set by the user. In other examples, as further shown, the recipient may provision the virtual card number to a third-party virtual wallet using a third-party wallet app 742.

According to examples, the virtual card number may be encrypted with a personal identification number (PIN) prior to transmitting the number to the recipient device 704. Accordingly, the recipient may be required to enter the PIN in order to use the virtual card number in the banking app 722 scenario, the third-party wallet app 742 scenario, or any other scenario.

Figure 8:
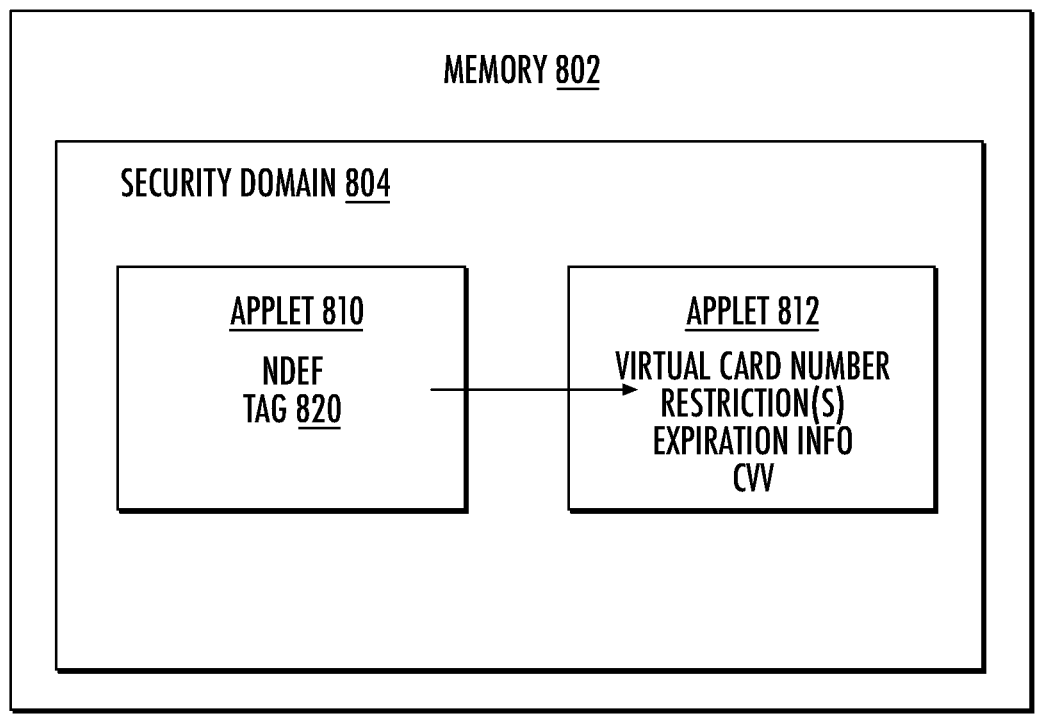
FIG. 8 illustrate example card applets and applet communication in accordance with one or more embodiments.

FIG. 8 illustrate example card applets stored in memory 802 of a contactless card and communication therebetween according to one or more embodiments. The contactless card may be the above-described blank, unlocked NFC-enabled card that receives the virtual card number by way of the NDEF tag sent from the user computing device. In addition to memory 802, the contactless card may also include one or more processors or processing circuitry (not shown), similar to contactless card 300 and its contact pad shown in FIGS. 3A and 3B.

As shown, the memory 802 of the card may include a security domain 804. Within the security domain 804, there may be at least two separate applets 810 and 812, which may be different from each other and both reside in the same security domain 804. In examples, the contactless card may receive the NDEF tag from the user computing device and the first applet 810 may consume or process the NDEF tag. The applet 810 may extract, derive, or otherwise obtain the virtual card number and other related information, e.g., expiration information, the one or more restrictions set by the user, card verification value (CVV). The applet 810 may then forward the virtual card number and the related information to applet 812 such that the contactless card becomes active for use at point-of-sale systems or other NFC-enabled devices. In examples, a secure communication tunnel may be formed between the two applets 810 and 812 to forward or exchange the virtual card number, which, along with a new expiration date, CVV, one or more keys, etc., would then become the primary account number for the contactless card so that it can be used to make purchases in stores. It may be understood that applet 810 may be a banking applet and applet 812 may be a payment applet.

In further examples, the virtual card number may be encrypted with a PIN so that the recipient is required to enter or use the PIN to perform any transactions with the virtual card number via the contactless card.

Figure 9:
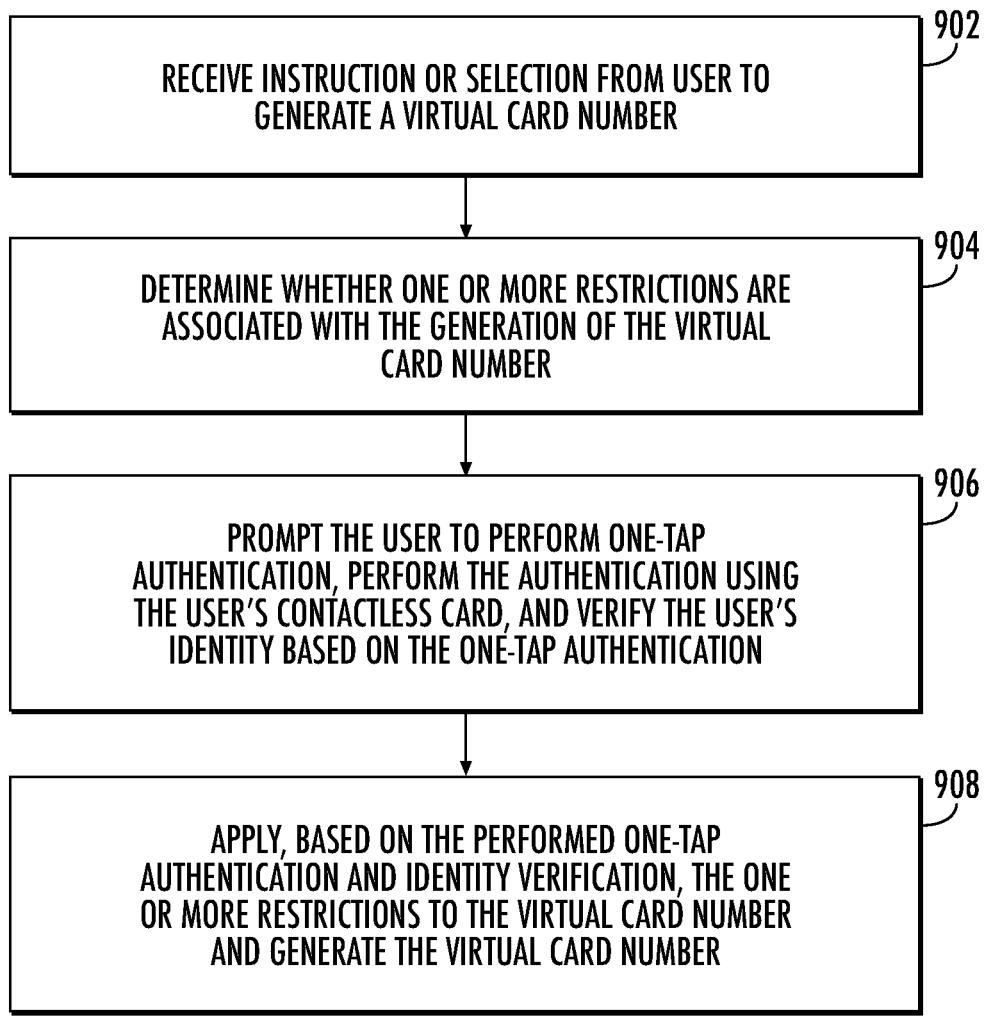
FIG. 9 illustrates an example flow diagram in accordance with one or more embodiments.

FIG. 9 illustrates an example flow diagram 900 according to one or more embodiments. The flow diagram 900 is related to personalizing one or more restrictions associated with a virtual card number to a recipient and generating the virtual card number. It may be understood that the blocks of the flow diagram 900 and the features described therein are not required to be performed in any particular order. Moreover, it may be understood that the flow diagram 900 and the features described therein may be executed or supported by one or more processors.

At block 902, a banking app, for example, may receive an instruction or selection from a user to generate a virtual card number. At block 904, it may be determined whether one or more restrictions are associated with the virtual card number. As described above, the one or more restrictions may be selected and set by the user in a manner that is personalized to the recipient, which may include a merchant restriction, an amount restriction, a time or time period restriction, and/or a location restriction. In some examples, there may not be any restrictions set by the user on the virtual card number.

To apply any restriction(s) and generate the virtual card number, one-tap contactless card authentication may be performed. Advantageously, this ensures that it is the user who is actually generating the card number and applying the restriction(s) thereto. At block 906, the banking app may prompt the user to perform one-tap authentication. In examples, the authentication is performed via the user's contactless card (which may be the payment instrument used to load or fund the virtual card number), and based on a successful authentication, the user's identity may be verified.

As described above, an NFC reader of the user computing device may detect the user's contactless card and receive one or more cryptograms therefrom, which may be used to determine whether the contactless card actually belongs to or is associated with the user. The cryptogram(s) may be decrypted by the user computing device via a diversified key (the diversified key derived from at least a counter value and a master key stored in memory) using the banking app and matched against authentication information related to the user, which may be received from one or more secure, remote computing devices (e.g., server computers). In another example, the cryptogram(s) may be sent to the one or more secure, remote computing devices, where the decryption of the cryptograms and the matching of the information contained therein to the user authentication information may be performed at the remote computing devices. Based on this determination, the verification of the user's identity may be confirmed.

Upon successful verification of the user's identity via the one-tap authentication, at block 908, the one or more restrictions that were selected and set by the user (if any) may be applied to the virtual card number. The bank app may then generate the virtual card number, which may be consumed in the different ways described above, e.g., written to a physical contactless card, transmitted to the recipient's computing device, etc. Also, as described above, the one-tap authentication may be performed at any point in the number generation process, such as prior to the user selecting and setting the one or more restrictions.

While the embodiments and examples described above involve a reader coil implemented in a mobile computing device, it may be understood that the power to any NFC reader installed in any type of device may be dynamically adjusted to improve NFC communication. Moreover, the above described NDEF messages and corresponding payloads may include message content or data related to various use cases of the contactless card, such as contactless card activation, user verification, user authentication, various transactions, sales, purchases, etc.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose and may be selectively activated or reconfigured by a computer program stored in the computer. The procedures presented herein are not inherently related to a particular computer or other apparatus. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
   a display device;
   near field communication (NFC) circuitry;
   memory configured to store instructions;
   processing circuitry coupled with the memory and the NFC circuitry to:
   detect an indication to generate a virtual card number for a second device based on a first contactless card;
   display a prompt on the display device, prompting a user to tap the first contactless card to the apparatus to communicate via NFC;
   establish an NFC exchange with the first contactless card via NFC circuitry based on the first contactless card being tapped to the apparatus; and
   after establishing the NFC exchange, receive encrypted data from the first contactless card, the encrypted data comprising identifying information to authenticate the user;

send the encrypted data to a remote device for authentication;
receive an indication from the remote device that authentication is successful;
determine, in response to the successful authentication, the virtual card number; and
establish, via the NFC circuitry, a second NFC exchange with the second device; and
perform, via the NFC circuitry, an NFC operation to send the virtual card number to the second device as part of the second NFC exchange.

2. The apparatus of claim 1, the processing circuitry further to:
determine one or more restrictions associated with the virtual card number; and
send, to the remote device, the one or more restrictions to apply to the virtual card number.

3. The apparatus of claim 2, the processing circuitry further to receive the one or more restrictions via a user input on a graphical user interface (GUI) presented on the display device.

4. The apparatus of claim 2, wherein the one or more restrictions include a merchant restriction, an amount restriction, a time period restriction, and/or a location restriction.

5. The apparatus of claim 1, wherein the processing circuitry of the apparatus is further caused to securely transmit, via the NFC circuitry, expiration date and card verification value (CVV) information to the second device.

6. The apparatus of claim 2, the processing circuitry further to:
receive, via a user input, a modification of the one or more restrictions; and
send, to the remote device, the modification of the one or more restrictions to apply to the virtual card number.

7. The apparatus of claim 1, wherein the virtual card number is associated with a user account wherein the user account is a money account, a checking account, a credit card account, a debit card account, a digital wallet account, or a cryptocurrency account.

8. The apparatus of claim 1, wherein the virtual card number is associated with a personal identification number (PIN), wherein the PIN is required to use the virtual card number.

9. The apparatus of claim 1, the processing circuitry further to send and provision the virtual card number to a third-party digital wallet of the apparatus.

10. The apparatus of claim 1, further comprising a display coupled with the processing circuitry to display a prompt to place the second device on a surface of the display in a graphical user interface (GUI).

11. A computer-implemented method, comprising:
detecting an indication to generate a virtual card number for a second device based on a first contactless card;
displaying a prompt on a display device, prompting a user to tap the first contactless card to an apparatus to communicate via near field communication (NFC);
establishing a NFC exchange with the first contactless card via NFC circuitry based on the first contactless card being tapped to the apparatus; and
after establishing the NFC exchange, receiving encrypted data from the first contactless card, the encrypted data comprising information to authenticate the user;
sending the encrypted data to at least one remote device to authenticate the user;
receiving an indication that the user is successfully authenticated;
generating, after receipt of the successful authentication, the virtual card number; and
establishing, via the NFC circuitry, a second NFC exchange with the second device; and
performing, via the NFC circuitry, an NFC operation to send the virtual card number to the second device.

12. The computer-implemented method of claim 11, comprising:
determining one or more restrictions associated with the virtual card number; and
sending, to the remote device, the one or more restrictions to apply to the virtual card number.

13. The computer-implemented method of claim 12, comprising receiving the one or more restrictions via a user input on a graphical user interface (GUI) presented on a display device of the apparatus.

14. The computer-implemented method of claim 12, wherein the one or more restrictions include a merchant restriction, an amount restriction, a time period restriction, and/or a location restriction.

15. The computer-implemented method of claim 11, further comprising causing to securely transmit, via the NFC circuitry, expiration date and card verification value (CVV) information to the second device.

16. The computer-implemented method of claim 12, comprising:
receiving, via a user input, a modification of the one or more restrictions; and
sending, to the remote device, the modification of the one or more restrictions to apply to the virtual card number.

17. A non-transitory computer-readable storage medium storing computer readable program code executable by a processor, wherein execution of the computer-readable program code causes the processor to:
detect an indication to generate a virtual card number for a second device based on a first contactless card;
display a prompt on a display device, prompting a user to tap the first contactless card to an apparatus to communicate via NFC;
establish an NFC exchange with the first contactless card via NFC circuitry based on the first contactless card being tapped to the apparatus; and
after establishing the NFC exchange, receive encrypted data from the first contactless card, the encrypted data comprising information to authenticate the user;
send the encrypted data to a remote device to authenticate the user;
receive an indication from the remote device of a successful authentication;
determine, in response to the successful authentication, a virtual card number;
establish, via the NFC circuitry, a second NFC exchange with the second device; and
perform, via the NFC circuitry, an NFC operation to send the virtual card number to the second device.

18. The computer-readable storage medium of claim 17, wherein the virtual card number is associated with a personal identification number (PIN), wherein the PIN is required for use of the virtual card number.

19. The computer-readable storage medium of claim 17, wherein execution of the code further causes the processor to send and provision the virtual card number to a third-party digital wallet of the apparatus.

20. The computer-readable storage medium of claim 17, wherein execution of the code further causes the processor to present a prompt on the display device to prompt the user to provide the first contactless card on a surface of the apparatus or within a distance of the apparatus to communicate the encrypted data.

\* \* \* \* \*

UNITED STATES PATENT AND TRADEMARK OFFICE
CERTIFICATE OF CORRECTION

PATENT NO. : 12,321,922 B2
APPLICATION NO. : 18/609021
DATED : June 3, 2025
INVENTOR(S) : Jeffrey Rule et al.

It is certified that error appears in the above-identified patent and that said Letters Patent is hereby corrected as shown below:

In the Claims

In Claim 17 Column 20, Line 33, change the following:
"storing computer readable program code executable by a"
To:
--storing computer-readable program code executable by a--.

In Claim 17 Column 20, Line 51, change the following:
"determine, in response to the successful authentication, a virtual card number;"
To:
--determine, in response to the successful authentication, the virtual card number;--.

Signed and Sealed this
Twenty-eighth Day of October, 2025

John A. Squires
*Director of the United States Patent and Trademark Office*